United States Patent
Huber et al.

(10) Patent No.: US 8,474,754 B2
(45) Date of Patent: Jul. 2, 2013

(54) CARGO HOLD FLOOR FOR A CARGO HOLD OF AN AIRCRAFT AND METHOD FOR THE INSTALLATION THEREOF

(75) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 251 days.

(21) Appl. No.: 12/721,475

(22) Filed: Mar. 10, 2010

(65) Prior Publication Data

US 2010/0230535 A1 Sep. 16, 2010

(30) Foreign Application Priority Data

Mar. 10, 2009 (DE) .......................... 10 2009 012 424

(51) Int. Cl.
*B64C 1/22* (2006.01)

(52) U.S. Cl.
USPC .................................... 244/118.1; 244/118.2

(58) Field of Classification Search
USPC ...................... 244/118.1, 118.2, 137.1, 117 R
See application file for complete search history.

(56) References Cited

U.S. PATENT DOCUMENTS

| | | | |
|---|---|---|---|
| 7,967,251 B2 * | 6/2011 | Wood | 244/120 |
| 2004/0016846 A1 * | 1/2004 | Blackwell-Thompson et al. | 244/118.1 |
| 2006/0231681 A1 * | 10/2006 | Huber et al. | 244/119 |
| 2008/0173755 A1 * | 7/2008 | Benthien | 244/118.1 |
| 2010/0140396 A1 * | 6/2010 | Guering | 244/118.1 |

FOREIGN PATENT DOCUMENTS

| | | |
|---|---|---|
| DE | 19720224 A1 | 10/1998 |
| EP | 1 646 558 B1 | 4/2006 |
| EP | 1714868 A2 | 10/2006 |
| WO | 2005012083 | 2/2005 |
| WO | 2006051235 A1 | 5/2006 |
| WO | 2007057411 A1 | 5/2007 |

OTHER PUBLICATIONS

European Search Report (ESR) for related application No. EP 10155893.0, Jul. 19, 2010.

\* cited by examiner

*Primary Examiner* — Timothy D Collins
*Assistant Examiner* — Jamie S Stehle
(74) *Attorney, Agent, or Firm* — Barnes & Thornburg LLP

(57) ABSTRACT

Cargo hold floors are provided, and comprise panels or similar two-dimensional floor elements for the attachment of roller elements, ball elements, locking bar elements or similar functional elements. Support elements, in particular floor beams, are provided which support the two-dimensional floor elements whereby the floor elements are permanently joined to the support elements to make pre-fabricated floor modules and the floor modules are installable in the aircraft. To make installation work easier, separate load-bearing elements, for supporting the floor modules on and joining the floor modules to a body or a skin of the aircraft, are provided which, before the floor modules are installed in the aircraft, are joinable to the body or skin of the aircraft, and, when the floor modules are installed in the aircraft, are joinable to the support elements. As a result, it is possible in particular cases to make installation significantly easier.

5 Claims, 1 Drawing Sheet

CARGO HOLD FLOOR FOR A CARGO HOLD OF AN AIRCRAFT AND METHOD FOR THE INSTALLATION THEREOF

CROSS-REFERENCE TO RELATED APPLICATIONS

This application claims priority to foreign Patent Application No. DE 10 2009 012 424.1, filed on Mar. 10, 2009, the disclosure of which is incorporated herein by reference in its entirety.

FIELD OF THE INVENTION

The present invention relates to a cargo hold floor of an aircraft.

BACKGROUND OF THE INVENTION

Disclosed in EP 1 646 558 B1 are a cargo hold floor and a method for the installation thereof wherein the cargo hold floor is constructed of modules that are built outside the aircraft. This is illustrated schematically in associated FIG. 5. Floor module 20 comprises panels 21 as walkable two-dimensional elements as well as roller conveyors 23 which are permanently joined to support elements 25. Support elements 25 are permanently joined to the aircraft's outer skin 11 after insertion of a floor module 20 into a cargo hold 9 of an aircraft interior 10 which is situated underneath a passenger compartment 8. Installation of floor modules 20 is relatively complex. FIG. 5 depicts the arrangement described in EP 1 646 558 B1.

SUMMARY OF THE INVENTION

Embodiments of the present invention advantageously provide a cargo hold and a method for the construction thereof to the effect that simplified installation of the floor modules is facilitated.

In one embodiment, a cargo hold floor for a cargo hold of an aircraft comprises panels or similar two-dimensional elements for the attachment of roller elements, ball elements, locking bar elements, PDUs or similar functional elements, floor beams or similar support elements which support the two-dimensional floor elements wherein the floor elements are permanently joined to the support elements to make prefabricated floor modules and the floor modules are installable in the aircraft, whereby for supporting the floor modules on and joining the floor modules to a body or a skin of the aircraft, separate load-bearing elements are provided which before the floor modules are installed in the aircraft are joinable to the body or skin of the aircraft and when the floor modules are installed in the aircraft are joinable to the support elements.

In another embodiment, a method for the installation of a cargo hold floor in an aircraft comprises building of floor modules outside the aircraft, installation of load-bearing elements in the aircraft, introduction of individual floor modules into the aircraft, and joining of the floor elements to the load-bearing elements.

Advantageously, the load-bearing elements—unlike those described in the printed document cited above—are installable in the aircraft without restricting the space available to the installation staff. This makes installation significantly easier.

Collision-free installation is still possible particularly when the floor modules are not of a flat construction, as shown in FIG. 5, but include superstructures that reach up to the cargo hold's roof.

Preferably the load-bearing elements comprise position compensating elements which enable tolerance compensation particularly in the aircraft's longitudinal direction. This makes installation even easier.

The load-bearing elements may be designed as individual posts which can be joined to a floor module after its introduction, in particular to its support elements that run transverse to the aircraft's longitudinal axis. Alternatively, it is also possible to combine such load-bearing elements into groups, particularly into a single group such that the load-bearing elements can be handled consistently. This also makes installation work easier and can also contribute towards an increase in stability.

Moreover, it is advantageous if the load-bearing elements have a structure which strengthens them after joining to the support elements. This must be ensured particularly if the load-bearing elements are combined into a group. As a result, the support elements of the modules may be of a less solid and thus also lighter design.

BRIEF DESCRIPTION OF THE DRAWINGS

The invention will be explained subsequently in greater detail on the basis of embodiments.

DETAILED DESCRIPTION

Figure 1:
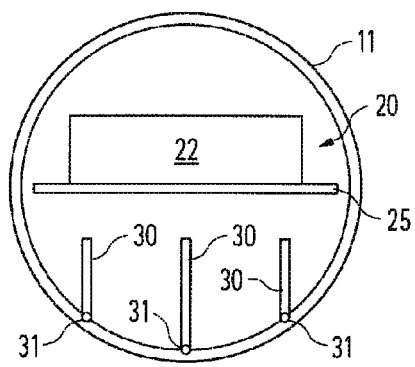
FIG. 1 is a first embodiment of the invention after introduction of a floor module into a cargo hold.

The invention will now be described with reference to the drawing figures, in which like reference numerals refer to like parts throughout.

Figure 2:
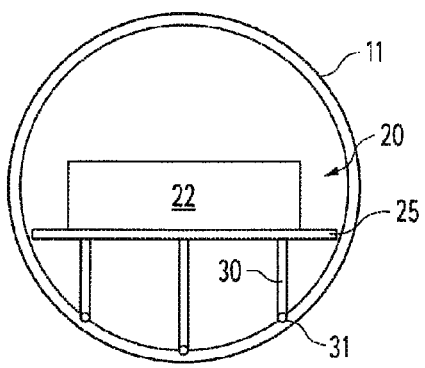
FIG. 2 depicts the arrangement according to FIG. 1 after placing the floor module on load-bearing elements.
Figure 3:
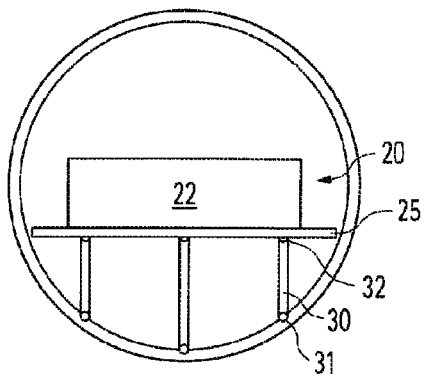
FIG. 3 depicts the arrangement according to FIG. 2 in the pre-assembled state.
Figure 4:
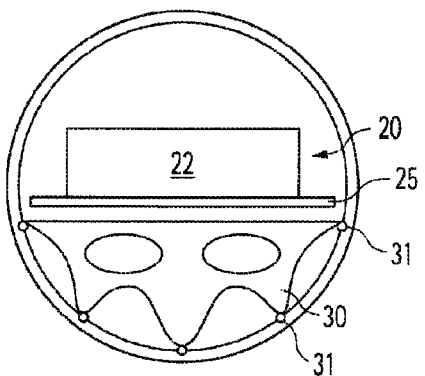
FIG. 4 is an alternative embodiment of the invention with grouped load-bearing elements and FIG. 5 depicts the arrangement described in EP 1 646 558 B1.

FIGS. 1 to 3 show—in a highly schematic form and certainly not to the correct scale—how a floor module 20 includes a support element (floor beam) 25 and attached thereto a superstructure 22.

Already in the aircraft in this diagram are load-bearing elements 30 attached using lower joining devices 31 to outer skin 11 of the aircraft. The load-bearing elements 30 comprise a plurality of elongate posts. Each post has a length between a lower end of the post and an upper end of the post. The plurality of posts includes posts having different lengths. The upper ends of the load-bearing posts are generally linearly aligned with one another for the receipt of a floor beam of a floor module.

Figure 5:
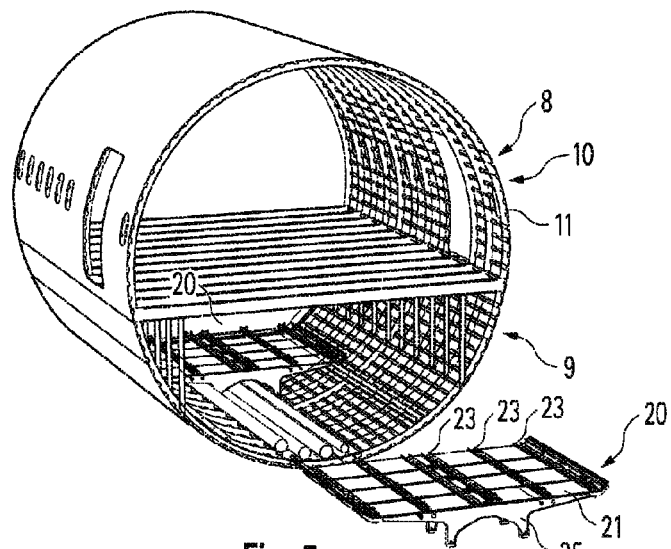

After placing floor module 20 onto the upper ends of load-bearing elements 30 (see FIG. 2), load-bearing elements 30 are joined using upper joining devices 32 to support elements 25 as is indicated in FIG. 3. It emerges from these diagrams that installation of load-bearing elements 30 inside the aircraft, which actually takes place prior to insertion of modules 20, leaves the installation staff a great deal more space than when using the conventional floor modules illustrated in FIG. 5.

Another significant advantage of this arrangement is that if superstructure 22 of floor module 20 is very tall then introduction of conventionally built floor modules 5 into the cargo hold is only possible to a limited extent or only permits lower superstructures 22.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A cargo hold floor for a cargo hold of an aircraft comprising:
    panels for the attachment of functional elements,
    floor beams being joined to the panels to form pre-fabricated floor modules, the floor modules being installable in the aircraft,
    load-bearing elements being separately joinable to the body of the aircraft by means of lower joining devices prior to the installation of the floor modules, said load-bearing elements comprising a plurality of elongate posts, each said post extending lengthwise and having a length between a lower end and an upper end of said post, said plurality of posts including posts having different lengths, each said post extending vertically from a lower joining device into the aircraft interior when said lower end of said post is joined to the body of the aircraft such that said upper ends of said posts are generally linearly aligned with one another,
    upper joining devices for joining said upper ends of said posts to the floor beams of said floor modules after joining the lower ends of said posts to the body of the aircraft, whereby a plurality of said posts extend lengthwise vertically between the body of the aircraft and a floor beam of a floor module with said posts being spaced apart from one another along said floor beam.

2. The cargo hold floor according to claim 1, wherein the load-bearing elements comprise position compensating elements which enable tolerance compensation particularly in the aircraft's longitudinal direction.

3. The cargo hold floor according to claim 1, wherein a plurality of said load-bearing elements are combined into uniform manageable bodies.

4. The cargo hold floor according to claim 1, wherein the load-bearing elements include structure to support the floor modules.

5. A method for the installation of a cargo hold floor in an aircraft, comprising:
    building one or more floor modules outside of the aircraft, each said floor module including one or more floor beams;
    positioning a plurality of elongate load-bearing posts in the aircraft such that the load-bearing posts extend lengthwise from the body of the aircraft vertically into the interior of the aircraft prior to moving the floor modules into the aircraft, each said post having a length between a lower end of said post and an upper end of said post, said plurality of posts including posts having different lengths;
    joining the lower ends of the load-bearing posts to the body of the aircraft prior to moving the floor modules into the aircraft such that said upper ends of said load-bearing posts are generally linearly aligned with one another for the receipt of a floor beam of a floor module;
    moving one or more floor modules from outside of the aircraft into the aircraft;
    placing one or more floor modules onto upper ends of the load-bearing posts; and
    joining of one or more floor modules to the upper ends of the load-bearing posts such that a plurality of load-bearing posts extend lengthwise between the body of the aircraft and a floor beam of a floor module with said posts being spaced apart from one another along said floor beam.

* * * * *